United States Patent
Karpenko

(10) Patent No.: US 9,071,756 B2
(45) Date of Patent: Jun. 30, 2015

(54) SYSTEMS AND METHODS FOR DIGITAL VIDEO STABILIZATION VIA CONSTRAINT-BASED ROTATION SMOOTHING

(71) Applicant: Facebook, Inc., Menlo Park, CA (US)

(72) Inventor: Alexandre Karpenko, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 14/101,252

(22) Filed: Dec. 9, 2013

(65) Prior Publication Data

US 2014/0160309 A1  Jun. 12, 2014

Related U.S. Application Data

(60) Provisional application No. 61/735,976, filed on Dec. 11, 2012.

(51) Int. Cl.
*H04N 5/232* (2006.01)

(52) U.S. Cl.
CPC ....... *H04N 5/23267* (2013.01); *H04N 5/23258* (2013.01); *H04N 5/2329* (2013.01)

(58) Field of Classification Search
CPC .......... H04N 5/23248; H04N 5/23251; H04N 5/144; H04N 5/2628; H04N 5/2627; H04N 5/272
USPC ......................................... 348/208.1, 208.99
See application file for complete search history.

(56) References Cited

U.S. PATENT DOCUMENTS

| | | | |
|---|---|---|---|
| 6,636,216 B1 | 10/2003 | Silverbrook et al. | |
| 7,015,954 B1 | 3/2006 | Foote et al. | |
| 7,593,042 B2 | 9/2009 | Cutler | |
| 2001/0010546 A1 | 8/2001 | Chen | |
| 2004/0001705 A1* | 1/2004 | Soupliotis et al. | 386/117 |
| 2009/0002501 A1* | 1/2009 | Silsby et al. | 348/208.16 |
| 2011/0169914 A1* | 7/2011 | Lowe et al. | 348/43 |
| 2012/0293505 A1 | 11/2012 | Meadow et al. | |
| 2012/0307084 A1* | 12/2012 | Mantzel et al. | 348/208.2 |
| 2013/0162518 A1* | 6/2013 | Athavale et al. | 345/156 |

FOREIGN PATENT DOCUMENTS

| | | |
|---|---|---|
| JP | 2001094857 | 4/2001 |
| JP | 2002503893 | 2/2002 |

OTHER PUBLICATIONS

Agrawal, Amit et al., "Invertible Motion Blur in Video," ACM Transactions on Graphics—Proceedings of ACM SIGGRAPH 2009, vol. 28, Iss. 3, Article No. 95, pp. 95:1-95:8, Aug. 2009.

(Continued)

*Primary Examiner* — Mekonnen Dagnew
(74) *Attorney, Agent, or Firm* — Sheppard Mullin Richter & Hampton LLP

(57) ABSTRACT

Systems and methods for digital video stabilization via constraint-based rotation smoothing are provided. Digital video data including a set of image frames having associated time stamps and a set of camera orientation data having associated time stamps may be provided. A smoothed set of camera orientation data may be generated by minimizing a rate of rotation between successive image frames while minimizing an amount of empty regions in a resulting set of smoothed image frames reoriented based on the smoothed set of camera orientation data.

20 Claims, 8 Drawing Sheets

(56) References Cited

OTHER PUBLICATIONS

Ait-Aider, Omar et al., "Kinematics from Lines in a Single Rolling Shutter Image," IEEE Computer Society Conference on Computer Vision and Pattern Recognition, pp. 1-6, Jun. 18, 2007.

Battiato, Sebastiano et al., "SIFT Features Tracking for Video Stabilization," 14th International Conference on Image Analysis and Processing, pp. 825-830, Sep. 10, 2007.

Bhat, Pravin et al., "Using Photographs to Enhance Videos of a Static Scene," Proceedings of the 18th Eurographics Conference on Rendering Techniques, pp. 327-338, 2007.

Buehler, Chris et al, "Non-Metric Image-Based Rendering for Video Stabilization," Proceedings of the 2001 IEEE Computer Society Conference on Computer Vision and Pattern Recognition, vol. 2, pp. 609-614, Dec. 8, 2001.

Cho, Won-Ho et al., "Affine Motion Based CMOS Distortion Analysis and CMOS Digital Image Stabilization," IEEE Transactions on Consumer Electronics, vol. 53, Iss. 3, pp. 833-341, Aug. 2007.

Chun, Jung-Bum et al., "Suppressing Rolling-Shutter Distortion of CMOS Image Sensors by Motion Vector Detection," IEEE Transactions on Consumer Electronics, vol. 54, Iss. 4, pp. 1479-1487, Nov. 2008.

El Gamal, Abbas et al., "CMOS Image Sensors," IEEE Circuits and Devices Magazine, vol. 21, Iss. 3, pp. 6-20, May 2005.

Fischler, Martin A. et al., "Random Sample Consensus: A Paradigm for Model Fitting with Applications to Image Analysis and Automated Cartography," Communications of the ACM, vol. 24, No. 6, pp. 381-395, Jun. 1981.

Forssen, Per-Erik et al., "Rectifying Rolling Shutter Video from Hand-Held Devices," 2010 IEEE Conference on Computer Vision and Pattern Recognition, pp. 507-514, Jun. 13, 2010.

Hwangbo, Myung et al., "Inertial-Aided KLT Feature Tracking for a Moving Camera," IEEE/RSJ International Conference on Intelligent Robots and Systems, pp. 1909-1916, Oct. 11, 2009.

Joshi, Neel et al., "Image Deblurring Using Inertial Measurement Sensors," ACM Transactions on Graphics—Proceedings of ACM SIGGRAPH 2010, vol. 29, Iss. 4, Article No. 30, pp. 30:1-30:9, Jul. 2010.

Karpenko, Alexandre et al., "Digital Video Stabilization and Rolling Shutter Correction using Gyroscopes," Stanford University Computer Science Tech Report, CSTR 2011-03, Oct. 1, 2011.

Kurazume, Ryo et al., "Development of Image Stabilization System for Remote Operation of Walking Robots," Proceedings of IEEE International Conference on Robotics and Automation, vol. 2, pp. 1856-1861, Apr. 24, 2000.

Liang, Chia-Kai et al., "Analysis and Compensation of Rolling Shutter Effect," IEEE Transactions on Image Processing, vol. 17, No. 8, pp. 1323-1330, Aug. 2008.

Liu, Feng et al., "Content-Preserving Warps for 3D Video Stabilization," ACM Transactions on Graphics—Proceedings of ACM SIGGRAPH 2009, vol. 28, Iss. 3, Article No. 44, pp. 44:1-44:9, Aug. 2009.

Lowe, David G., "Distinctive Image Features from Scale-Invariant Keypoints," International Journal of Computer Vision, vol. 60, Iss. 2, pp. 91-110, Nov. 2004.

Matsushita, Yasuyuki et al., "Full-Frame Video Stabilization with Motion Inpainting," IEEE Transactions on Pattern Analysis and Machine Intelligence, vol. 28, No. 7, pp. 1150-1163, Jul. 2006.

Shoemake, Ken, "Animating Rotation with Quaternion Curves," ACM SIGGRAPH Computer Graphics, vol. 19, No. 3, pp. 245-254, Jul. 22, 1985.

International Application No. PCT/US2013/074444, International Search Report and Written Opinion mailed Mar. 31, 2014.

\* cited by examiner

SYSTEMS AND METHODS FOR DIGITAL VIDEO STABILIZATION VIA CONSTRAINT-BASED ROTATION SMOOTHING

PRIORITY

This application claims the benefit of priority to U.S. Provisional Patent Application No. 61/735,976, filed Dec. 11, 2012, which is hereby incorporated by reference.

FIELD OF THE INVENTION

The subject matter of the present disclosure relates to signal processing. More particularly, the present disclosure relates to systems and methods for image and video processing.

BACKGROUND

Digital still cameras capable of capturing video have become widespread in recent years. While the resolution and image quality of these consumer devices has improved up to the point where they rival digital single-lens reflex cameras (DSLRs) in some settings, their video quality may still be significantly worse than that of film cameras. The reason for this gap in quality may be twofold. First, compared to film cameras, cell phones may be significantly lighter. As a result, hand-held video capture on such devices may exhibit a greater amount of camera shake. Second, cell-phone cameras may have sensors that make use of a rolling shutter (RS). In an RS camera, each image row may be exposed at a slightly different time, which, combined with undampened camera motion, may result in a "wobble" in the output video.

Video stabilization is a family of techniques used to reduce high-frequency frame-to-frame jitter produced by video camera shake. In professional cameras, mechanical image stabilization (MIS) systems are commonly used. For example, in an MIS system, the operator may wear a harness that separates the camera's motion from the operator's body motion. Other MIS systems stabilize the optics of the camera rather than the camera body itself. These systems may move the lens or sensor to compensate for small pitch and yaw motions. These techniques work in real time and do not require computation on the camera. However, they are not suitable for mobile devices and inexpensive cameras, because of their price and size. Digital video stabilization systems may employ feature trackers to stabilize videos post-capture. However, these systems may be sensitive to noise (e.g., fast moving foreground objects) and require distinctive features for tracking. As a result, digital stabilization based on feature tracking often breaks down, especially in adverse lighting conditions and excessive foreground motion. In addition, extracting and matching visual cues across frames can be computationally expensive. Furthermore, the expense grows with the resolution of the video. In some instances, this may be too costly to perform video stabilization in real time. Consequently, such approaches are rarely employed in current digital cameras. Instead, manufacturers can opt for more robust (and expensive) mechanical stabilization solutions for high-end DSLRs.

SUMMARY OF THE INVENTION

To stabilize digital video, computer implemented methods, systems, and computer readable media, in an embodiment, may provide digital video data including a set of image frames having associated time stamps and a set of camera orientation data having associated time stamps. A smoothed set of camera orientation data may be generated by minimizing a rate of rotation between successive image frames while minimizing an amount of empty regions in a resulting set of smoothed image frames reoriented based on the smoothed set of camera orientation data.

In an embodiment, the amount of empty regions in the resulting set of smoothed image frames may be minimized to zero.

In an embodiment, the amount of empty regions in the resulting set of smoothed image frames may be minimized below a threshold value.

In an embodiment, the set of image frames may be warped based on the associated time stamps for the set of image frames and the smoothed set of camera orientation data to form a set of corrected image frames.

In an embodiment, the warping of the set of image frames based on the associated time stamps for the set of image frames and the smoothed set of camera orientation data to form a set of corrected image frames may include dividing an individual image frame into a plurality of subsections. Each subsection may have an associated time stamp and camera orientation. The warping of the set of image frames based on the associated time stamps for the set of image frames and the smoothed set of camera orientation data to form a set of corrected image frames may include realigning each subsection based on the associated time stamp and camera orientation to form an individual corrected image frame.

In an embodiment, the set of corrected image frames may be displayed as a video.

In an embodiment, the amount of empty regions in the resulting set of smoothed image frames may be minimized below a threshold value.

In an embodiment, the amount of empty regions below the threshold value may be inpainted.

In an embodiment, the set of camera orientation data having associated time stamps may be provided from a gyroscope of a handheld device.

In an embodiment, the set of image frames may be provided from a camera of a handheld device.

In an embodiment, the set of camera orientation data having associated time stamps may be provided from a gyroscope of a handheld device including a mobile phone and a digital camera. The set of image frames may be provided from the digital camera.

In an embodiment, the generating of the smoothed set of camera orientation data includes an iterative optimization based on gradient descent.

In an embodiment, the generating the smoothed set of camera orientation data may include filtering based on a Gaussian filter.

In an embodiment, the generating of the smoothed set of camera orientation data may include filtering based on a temporal derivative.

In an embodiment, the set of camera orientation data may include rotations without any translations.

In an embodiment, the set of camera orientation data may include vectors having both rotations and translations.

In an embodiment, the generating the smoothed set of camera orientation data is performed by a social networking system.

In an embodiment, the set of image frames having associated time stamps and the set of camera orientation data having associated time stamps may be uploaded to the social networking system by a user of the social networking system.

Many other features and embodiments of the invention will be apparent from the accompanying drawings and from the following detailed description.

Figure 1:
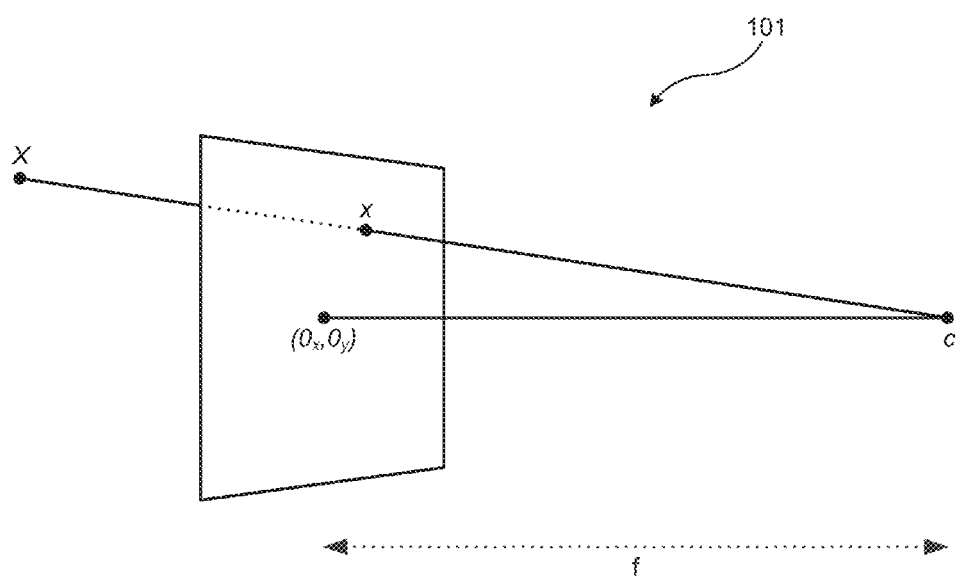
FIG. 1 illustrates an example pinhole camera model, according to an embodiment.

The figures depict various embodiments of the present invention for purposes of illustration only, wherein the figures use like reference numerals to identify like elements. One skilled in the art will readily recognize from the following discussion that alternative embodiments of the structures and methods illustrated in the figures may be employed without departing from the principles of the invention described herein.

DETAILED DESCRIPTION

Digital Video Stabilization and Rolling Shutter Correction Using Gyroscopes

Rolling shutter correction is a technique for removing image warping produced by intra-frame camera motion. High-end cameras use charge-coupled device (CCD) sensors, which have a global shutter (GS). In a GS camera, including many DSLRs, all pixels on the CCD sensor are read out and reset simultaneously. Therefore all pixels collect light during the same time interval. Consequently, camera motion during the exposure results in some amount of image blur on these devices. In contrast, low-end cameras typically make use of complementary metal oxide semiconductor (CMOS) sensors. In particular, these sensors employ a rolling shutter, where image rows are read out and reset sequentially. This approach may require less circuitry compared to CCD sensors and may make CMOS sensors cheaper to manufacture. For that reason, CMOS sensors are frequently used in cell phones, music players, and some low-end camcorders. The sequential readout, however, means that each row is exposed during a slightly different time window. As a result, camera motion during row readout will produce a warped image. Fast moving objects will also appear distorted.

Image readout in an RS camera is typically in the millisecond range. Therefore, RS distortions are primarily caused by high-frequency camera motions. MIS systems could, therefore, be used to stabilize the camera. While this approach removes rolling shutter warping, in practice the price range and size of MIS systems make it not suitable for RS cameras. Some digital rolling shutter rectification techniques may correct RS artifacts in a single image, but require user input. In contrast, some embodiments of the present disclosure may correct RS artifacts for single images without requiring user input.

For video, rectifying RS in a sequence of frames using feature tracking to estimate the camera motion from the video may present problems. Once the camera motion is known during an RS exposure, it can be used to rectify the frame. Since this approach relies on feature trackers, it has the same disadvantages previously discussed in the case of video stabilization.

Digital video stabilization techniques may include cropping or zooming input video frames. This may allow individual frames to be translated, rotated, or warped to counteract undesired deformations introduced by hand shake. The amount of cropping may determine how much leeway (or "wiggle room") is available to remove these deformations. If, for example, the frame is translated too far, empty regions (e.g., regions which have no pixel data) may be visible. Some embodiments of the present disclosure not only smooth out the camera motion by counteracting hand shake, but may also do so while preventing empty regions from showing up. It should be appreciated that other methods for providing the leeway for stabilization, other than cropping or zooming, may also be implemented. For example, inpainting techniques may be implemented to fill empty regions introduced by stabilization. Inpainting may be used in lieu of, or in addition to, cropping or zooming. For instance, in an embodiment, a function may be implemented to determine whether a given deformation results in a frame with all pixels set (whether by inpainting, zooming, cropping, etc.) to satisfaction or not.

Systems and methods are provided for digitally stabilizing videos by computing smooth camera rotations that satisfy empty-region prevention constraints. This may enable maximally smooth camera rotations to be produced for a given crop or zoom factor.

The digital video stabilization process may begin, for example, with video being captured by a camera or device including a camera, such as a mobile phone, tablet, watch, wearable gear, etc. The video may include a number of successive image frames that are captured. The video may be shaky due to the device's size and weight. The rolling shutter used by sensors in the camera may produce warping in the output image frames. Gyroscopes may be used to measure the camera's motions (e.g., rotations) during video capture. The measured camera motion may be used to stabilize the video and to rectify the rolling shutter to result in the stabilized video having output frames with corrected images.

Techniques of the present disclosure may improve video quality of RS cameras. In an embodiment, microelectromechanical systems (MEMS) gyroscopes are implemented to measure camera rotations. Other gyroscopes and motion sensing devices may also be implemented. The gyroscopic measurements may be used to perform video stabilization (e.g., inter-frame motion compensation) and rolling shutter correction (e.g., intra-frame motion compensation). This approach may be both computationally inexpensive and robust, which may make it particularly suitable for real-time implementations on mobile platforms for instance.

Systems and methods based on a unified model of a rotating camera and a rolling shutter may utilize the model to compute a warp that simultaneously performs rolling shutter correction and video stabilization. Optimization techniques may be provided that automatically calibrate the gyroscope and camera. This may permit the recovery of unknown parameters, such as gyroscope drift and delay, as well as the camera's focal length and rolling shutter speed, from a single video and gyroscopic capture. As a result, any combination of gyroscope and camera hardware may be calibrated without the need for a specialized laboratory setup. A device including the camera may also include a motion sensing device, such as a gyroscope. For example, many smartphones have cameras and motion sensing devices, such as gyroscopes and accelerometers. In this way, real-time video stabilization and rolling shutter correction may be provided without requiring the use of feature trackers or MIS systems. Furthermore, inexpensive MEMS gyroscopes may be implemented to measure camera motion directly. Inertial measurement units (IMUs) may be used for image de-blurring and for aiding a KLT feature tracker Measuring camera motion using motion sensing devices, such as gyroscopes, permits digital video stabilization and RS rectification to be performed with high computational efficiency. This approach may be robust even under poor lighting or substantial foreground motion, because the video's content is not used for motion estimation. Furthermore, as stated above, many camera-enabled mobile phones are already equipped with gyroscopes or other motion sensing devices. Compared to MIS systems, MEMS gyroscopes may be significantly less inexpensive, more versatile, and less bulky.

In an embodiment, video stabilization may proceed in three stages: camera motion estimation, motion smoothing, and image warping. Rolling shutter rectification may proceed in a similar manner, except the actual camera motion may be used for the warping computation rather than the smoothed motion. As will be discussed in further detail herein, both video stabilization and rolling shutter correction may be performed in one warping computation under a unified framework.

In an embodiment, camera motion may be modeled in terms of rotations only. It should be appreciated that translations may be measured in addition to, or in place of, rotations in other embodiments. In some instances, translations may be difficult to measure accurately using IMUs for example. Moreover, accelerometer data may require being integrated twice to obtain translations. In contrast, gyroscopes measure the rate of rotation. Therefore, gyroscopic data may require only a single integration to obtain the camera's orientation. As a result, translation measurements may be significantly less accurate than orientation measurements in some instances. Furthermore, translation measurements may be complicated by objects at different depths moving by different amounts. In an embodiment, stereo or feature-based structure from motion (SfM) algorithms may be implemented to obtain depth information. Warping frames in order to remove translations may be performed in some embodiments, but may be complicated by parallax and occlusions.

Modeling camera translations in systems may present issues. For example, an optimizer may fall into a local minimum while attempting to reconstruct translations from a feature tracker. An algorithm may assume that the camera is imaging a purely planar scene (e.g., constant depth). Therefore, translation reconstruction may be complicated due to unmodeled parallax in the video.

Embodiments modeling camera rotation only in terms of rotations, or primarily in terms of rotations, may minimize the problems encountered with translations. Camera shake and rolling shutter warping occur primarily from rotations since translations attenuate quickly with increasing depth, and objects are typically sufficiently far away from the lens that translational camera jitter does not produce noticeable motion in the image.

Example Camera Model

In an embodiment, a rotational rolling shutter camera model that is based on a pinhole camera model is provided. FIG. 1 illustrates an example pinhole camera model 101, according to an embodiment. A ray from a camera center c to a point x in the scene will intersect the image plane at point x. Therefore the projection of the world onto the image plane depends on the camera's center c, the focal length f, and the location of the camera's axis ($o_x$, $o_y$) in the image plane. In a pinhole camera the relationship between image point x in homogeneous coordinates and the corresponding point X in 3D world coordinates may be specified by example equation (1).

$$x = KX, \text{ and } X = \lambda K^{-1} x \quad (1)$$

Here, $\lambda$ is an unknown scaling factor and K is the intrinsic camera. $K^{-1}$ may be specified by example equation (2).

$$K^{-1} = \begin{pmatrix} 1 & 0 & -o_x \\ 0 & 1 & -o_y \\ 0 & 0 & f \end{pmatrix} \quad (2)$$

($o_x$, $o_y$) is the origin of the camera axis in the image plane and f is the focal length. The camera's focal length is an unknown that may be recovered. The camera may be assumed to have square pixels and the upper diagonal entries set to 1. However, other embodiments may extend this model to take into account non-square pixels or other optical distortions.

Warping may occur from high-frequency camera rotations. For example, high-frequency camera rotations while the shutter is rolling from top to bottom may cause the output image to appear warped. This warped image may be modeled mathematically.

The world origin may be set to the camera origin. The camera motion may then be described in terms of its orientation R(t) at time t. Thus, for any scene point X, the corresponding image point x at time t may be given by example equation (3).

$$x = KR(t)X \quad (3)$$

The rotation matrices $R(t) \in SO(3)$ may be computed by compounding the changes in camera angle $\Delta\theta(t)$. The spherical linear interpolation (SLERP) of quaternions may be used in order to interpolate the camera orientation smoothly and to avoid gimbal lock. The change in angle between gyroscope samples may be sufficiently small that Euler angles work as well as rotation quaternions. $\Delta\theta(t)$ may be obtained directly from gyroscope measured rates of rotation $\omega(t)$, as specified in the following example equation (4).

$$\Delta\theta(t) = (\omega(t+t_d) + \omega_d) * \Delta t \quad (4)$$

$\omega_d$ is the gyroscope drift and $t_d$ is the delay between the gryoscope and frame sample timestamps. These parameters are additional unknowns in that model that may also be recovered.

Figure 3:
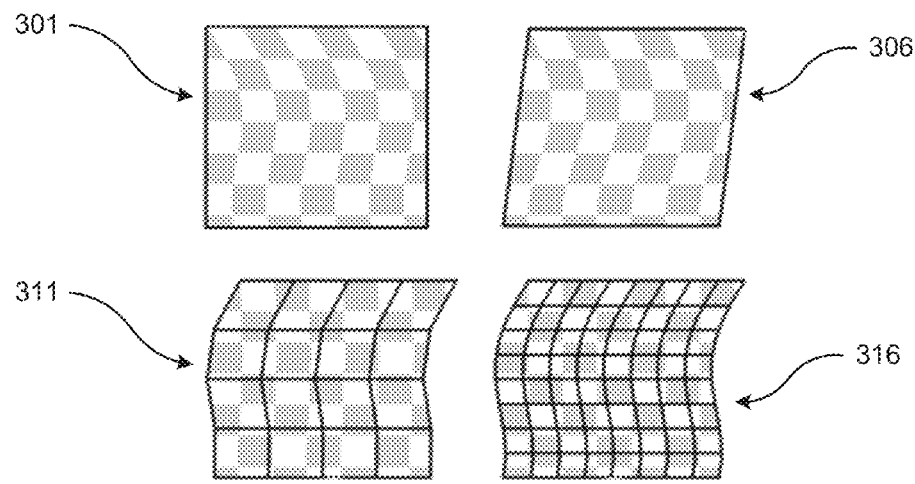
FIG. 3 illustrates a depiction of an example warped image captured by an RS camera and transformations to correct the image, according to an embodiment.

Rolling shutter may also be introduced into the camera model. In an RS camera, each image row is exposed at a slightly different time. Camera rotations during this exposure may, therefore, determine the warping of the image. Translational camera jitter during rolling shutter exposure does not significantly impact image warping because objects are typically far away from the lens. For example, if the camera sways from side to side while the shutter is rolling, then the output image will be warped as shown in FIG. 3. The time at which point x was imaged in frame i depends on how far down the frame it is. It may be determined that x was imaged at time t(i, y), as specified by the example equation (5).

$$t(i,y) = t_i + t_s * y/h, \text{ where } x = (x,y,1)^T \quad (5)$$

y is the image row corresponding to point x. h is the total number of rows in the frame. $t_i$ is the timestamp of the i-th frame. The $t_s$ term indicates that the farther down in a frame, the longer it took for the rolling shutter to get to that row. Hence, $t_s$ is the time it takes to read out a full frame going row by row from top to bottom. A negative $t_s$ value would indicate a rolling shutter that goes from bottom to top. Automatically recovering the sign and value of $t_s$ is described in further detail herein.

Figure 2:
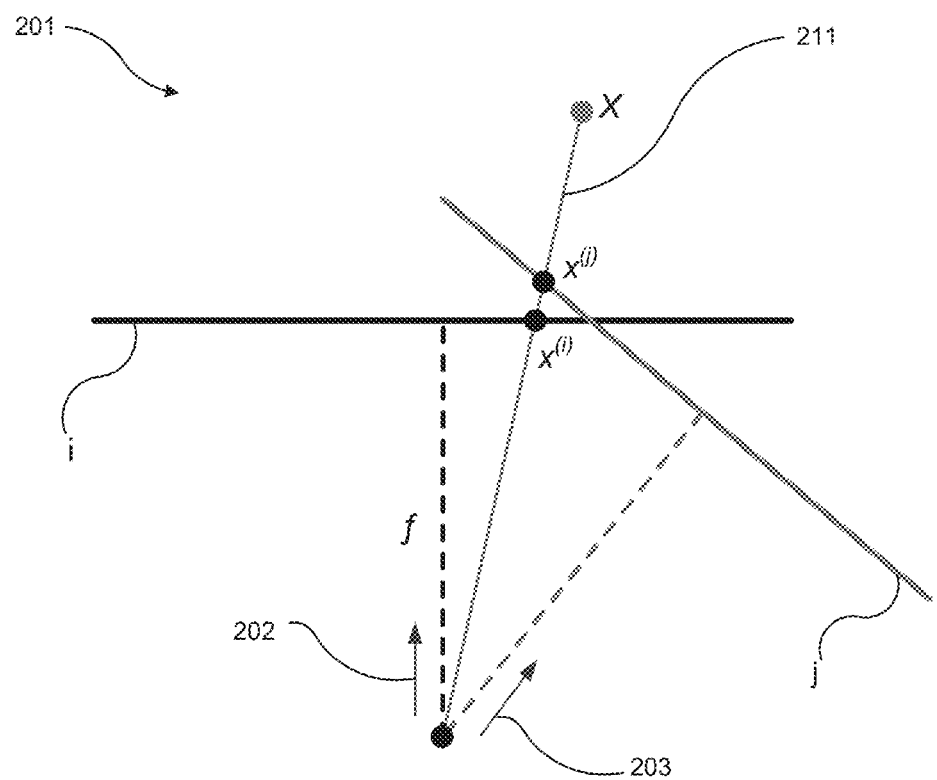
FIG. 2 illustrates a depiction of two example camera orientations and their corresponding image planes, according to an embodiment.

The relationship between image points in a pair of frames for two different camera orientations may be derived. FIG. 2 illustrates a graphical representation of two camera orientations and their corresponding image planes, according to an embodiment. Graphical representation 201 includes two camera orientations 202 and 203. Camera orientation 202 includes image plane i. Camera orientation 203 includes image plane j. An image of scene point X appears in the two frames where the ray 211 intersects the image planes i and j. For a scene point X, the projected points $x_i$ and $x_j$ in the image plane of two frames i and j, respectively, may be specified by the following example equations (6).

$$x_i = KR(t(i,y_i))X, \text{ and } x_j = KR(t(j,y_j))X \quad (6)$$

If these equations are rearranged and if X is substituted for, a mapping of all points in frame i to all points in frame j is obtained, as specified by example equation (7).

$$x_j = KR(t(j,y_j))R^T(t(i,y_i))K^{-1}x_i \quad (7)$$

While the relationship between two frames have been described in relation to the same video, in other embodiments, the frames may be mapped from one camera that rotates according to R(t) to another camera that rotates according to R'(t). In an embodiment, both camera centers may be assumed to be at the origin. The warping matrix W that maps points from one camera to the other may be specified according to the following example equation (8).

$$W(t_1,t_2) = KR'(t_1)R^T(t_2)K^{-1} \quad (8)$$

Equation 7 may now be specified more compactly according to the following example equation (9).

$$x_j = W(t(j,y_j))x_i, \text{ where } R' = R \quad (9)$$

W depends on both image rows $y_i$ and $y_j$ of image points $x_i$ and $x_j$, respectively. This warping matrix may be used to match points in frame i to corresponding points in frame j, while taking the effects of the rolling shutter into account in both frames.

This formulation of a warping matrix provides for rolling shutter correction and video stabilization. A synthetic camera may be created that has a smooth motion and a global shutter. This camera's motion may be computed by applying a Gaussian low-pass filter, for example, to the input camera's motion, which results in a new set of rotations R'. The rolling shutter duration $t_s$ for the synthetic camera may be set to 0 as for a global shutter. W($t_i$, t(i, $y_i$)) may then be computed at each image row $y_i$ of the current frame i, and the warp may be applied to that row. The first term of W may now only depend on the frame time $t_i$. This operation may map all input frames onto the synthetic camera, and as a result, simultaneously remove rolling shutter warping and video shake.

In certain embodiments, W($t_i$, t(i, $y_i$)) is not computed for each image row $y_i$. Instead, the input image may be subdivided and the warp computed at each vertical subdivision. FIG. 3 illustrates an example transformation to correct warp, according to an embodiment. Warped input image frame 301 shows a subdivided warped image that was captured by an RS camera. The warp is computed at each vertical subdivision, as shown in image frame 311. Image frame 311 shows a piecewise linear approximation of non-linear warping. As shown by resulting image frame 316, various numbers of subdivisions may be sufficient to eliminate artifacts. For example, in an embodiment, 10 subdivisions may be sufficient to eliminate visual artifacts. A warped mesh from the input image was created that is a piecewise linear approximation of the non-linear warp. While ten subdivisions may be sufficient to remove any visible RS artifacts, other embodiments may include a different number of subdivisions. The sampling approach may be referred to as inverse interpolation. Inverse interpolation may be easy to implement on a graphical processing unit (GPU) using vertex shaders. The GPU's fragment shader may take care of resampling the mesh-warped image using bilinear interpolation. RS warping in actual videos may not be strong enough to produce aliasing artifacts due to bilinear inverse interpolation. As a result, inverse interpolation may work well in practice. Rolling shutter correction using global image warps may assume that camera rotation is more or less constant during rolling shutter exposure. A linear approximation may fail to rectify the rolling shutter, as shown by image frame 306 in FIG. 3.

Camera and Gyroscope Calibration

Calibration techniques are provided for recovering the unknown camera and gyroscope parameters described herein. The calibration may enable the computation of W directly from the gyroscope data. The unknown parameters in the model described herein may include: the focal length of the camera f, the duration of the rolling shutter $t_s$, the delay between the gyroscope and frame sample timestamps $t_d$, and the gyroscope drift $w_d$.

In some instances, one or more of these parameters, such as the camera's focal length f, may be specified by the manufacturer. In some instances, these parameters may be measured experimentally. For example, a quickly flashing display may be used to measure the rolling shutter duration $t_s$. However, these techniques may tend to be imprecise and error prone. These techniques may also be tedious. The duration of the rolling shutter may typically be in the millisecond range. As a result, a small misalignment in $t_d$ or $t_s$ may cause rolling shutter rectification to fail.

In an embodiment, these parameters may be estimated from a single video and gyroscope capture. For example, the user may be record a video and a gyroscope trace while standing still and shaking the camera while pointing at a stationary object, such as a building. The duration of the clip may vary in different embodiments. In an embodiment, a short clip (e.g., ten seconds or less in duration) may be sufficient to estimate all the unknown parameters. This calibration step may only need to be done once for each camera and gyroscope arrangement.

In an embodiment, matching points are identified in consecutive video frames. The matching points may be identified using, for example, the scale invariant feature transform (SIFT). Outliers may be discarded using, for example, random sample consensus (RANSAC). The result may be a set of point correspondences $x_i$ and $x_j$ for all neighboring frames in the captured video. Given this ground truth, calibration may be formulated as an optimization problem where the mean-squared re-projection error of all point correspondences may be minimized. This is specified in the following example equation (10).

$$J = \sum_{(i,j)} \|x_j - W(t(j, y_j), t(i, y_i))x_i\|^2 \quad (10)$$

A number of non-linear optimizers may be used to minimize the objective function. Coordinate descent by direct objective function evaluation may converge quickly, and is implemented in one embodiment. Each time a step is taken where the objective function J does not decrease; the step direction is reversed and the step size of the corresponding parameter is decreased. The algorithm may terminate when the step size for all parameters drops below a desired threshold, such as when a target precision is achieved. The convergence may occur quickly in some instances. For example, in one embodiment, the convergence may occur in 2 seconds or less for a calibration video of about 10 seconds in duration.

In an embodiment, the optimization may be initialized by setting the focal length such that the camera has a field of view of 45°. All other parameters may be set to 0. With these initial conditions, the optimizer may converge to the correct solution for the dataset. More generally, falling into a local minimum (e.g., when the delay between the gyroscope and frame timestamps is large) may be avoided by restarting the coordinate descent algorithm for a range of plausible parameters, and selecting the best solution. The average re-projection error for correctly recovered parameters may be, for example, around 1 pixel.

An additional unknown in the model may be the relative orientation of the gyroscope to the camera. For example, rotations about the gyro's y-axis may correspond to rotations about the camera's x-axis.

To discover the gyroscope orientation, the 3 rotation axes may be permuted and the optimizer may be run for each permutation. The permutation that minimizes the objective best may correspond to the camera's axis ordering. The re-projection error may be significantly larger for incorrect permutations. Therefore, this method may work well in practice.

While it has been assumed that the camera has a vertical rolling shutter, the RS model may be easily modified to work for image columns instead of rows. Finding the minimum re-projection error for both cases may indicate whether the camera has a horizontal or vertical rolling shutter.

Finally, the results achieved by calibration may be demonstrated by analyzing the video and gyroscope signals before and after calibration. Assuming rotations between consecutive frames are small, the translations in the image may be approximately computed from rotations as specified in the following example equation (11).

$$\dot{x}(t) \approx f * \hat{\omega}(t + t_d), \quad (11)$$
$$\text{where } \begin{cases} \dot{x} = (\dot{x}, \dot{y})^T \\ \hat{\omega} = (\omega_y, \omega_x)^T \end{cases}$$

Equation (11) assumes there are no effects due to rolling shutter (e.g., $t_s=0$), and rotations about the z-axis (e.g., $\omega_z$) may be ignored. $\dot{x}$ is the average rate of translation along x and y for all point correspondences in consecutive frames. If the optimizer converged to the correct focal length f and gyroscope delay $t_d$, then the two signals should align. Before calibration, the amplitudes of the signals x and $f*\omega y$ $(t+t_d)$ do not match because the initial estimate for f is too low. The signals may be shifted when $t_d$ is initialized to 0. After calibration, the signals may be well aligned because accurate focal length and gyroscope delay have been recovered. Precise gyroscopes, such as MEMS gyroscopes, enable the gyroscope data to match the image motions, resulting in the improved video stabilization and rolling shutter correction.

Constraint-Based Rotation Smoothing

Figure 4:
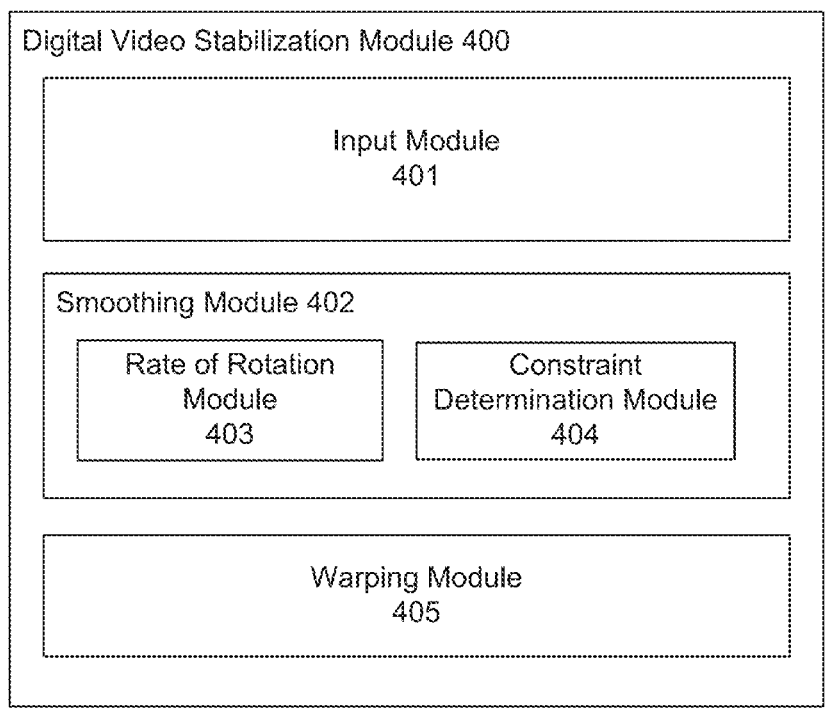
FIG. 4 illustrates an example digital video stabilization module, according to an embodiment.

In some aspects of the present disclosure, system and methods may be provided for computing an optimally smooth camera motion under the constraint that empty regions are not visible, or below a minimum threshold value. FIG. 4 illustrates an example digital video stabilization module, according to an embodiment. Digital video stabilization module 400 is shown including an input module 401, a smoothing module 402, and a warping module 403.

Input module 401 may provide inputs to be stabilized the smoothing module 402 and the warping module 405. Input module 401 may receive the inputs associated with the video that is to be stabilized. For example, inputs may include a set of N frames $F_i$, corresponding times $t_i$ for the N frames $F_i$, and camera orientations $\theta_i$, where i={1 . . . N}.

Smoothing module 402 computes a set of new smoothed camera orientations $\phi_i$ such that a constraint function $f(\phi, t)$ is satisfied. Smoothing module 402 may include rate of rotation module 403 and constraint determination module 404.

Rate of rotation module 403 computes the rate of rotation to ensure a sufficiently small rate of rotation is maintained for the generation of smooth camera orientations. Constraint determination module 404 determines whether a constraint is met for target orientations $\phi_i$ at time $t_i$. For example, in one embodiment, the constraint function $f(\phi,t)$ may return 1 or 0 depending on whether empty regions are visible or not, respectively, given a target orientation $\phi_i$ at time $t_i$.

For example, the constraint determination module 404 may determine whether a minimal amount of empty regions (e.g., below a threshold amount) are produced in successive image frames. If the amount of empty regions falls below the threshold amount, then the constraint is met (e.g., the amount of empty regions does not exceed the threshold amount), and the target orientation $\phi$ and its corresponding time t may be used to generate a smooth orientation that has a sufficiently small rate of rotation that does not generate an amount of empty spaces above a threshold value. If the constraint is not met (e.g., the amount of empty regions exceeds the threshold amount), then the corresponding target orientation $\phi$ may be adjusted to maintain a sufficiently small rate of rotation while satisfying the constraint. In an embodiment, the threshold amount of empty regions is zero. In another embodiment, the threshold amount of empty regions is approximately zero or a negligible value that is determined to be undetectable by the human eye. In yet another embodiment, the threshold amount of empty regions is a value that prevents cropping, zooming, or inpainting to be used effectively, such as to eliminate all empty regions, or approximately all empty regions. In other embodiments, the threshold amount of empty regions may be set as desired based on the application and level of tolerance.

Warping module 405 generates warped frames based on the set of new smoothed camera orientations $\phi_i$ computed by the smoothing module 402. For example, the warping module 405 may implement a warping function $g(F, \phi, t)$ that takes as input a frame F, a smoothed orientation $\phi$ and its corresponding time t, and generates a warped frame F'. Given the smoothly varying $\phi_i$ over $t_i$ as output by the smoothing module 402, and appropriate choices of functions f and g, the resulting warped frames F'$_i$ will compose a stabilized output video. The function f may depend on the choice of warping function g, and may simply indicate whether, after applying the warping function g, empty regions would be visible in the frame or not.

The specific warping function implemented may vary in different embodiments. Different warping functions may be appropriate for various cameras or desired approximations. For example, the warping function implemented may be based on whether a camera has a rolling shutter and minor lens aberrations or whether it has a global shutter. For instance, in one embodiment, for cameras with a global shutter, a homography warping function may be implemented. Other approximations, such as affine transformations, or a rotation plus a translation in the frame's image space may be implemented.

In an embodiment, the $\theta_i$ input are rotations in the SO(3) group. There are a variety of ways to represent rotations, such as by rotation matrixes and quaternions. Representations that lie in SO(3) may be converted into a representation that facilitates smooth interpolation, such as quaternions rather than Euler angles. The $\theta_i$ rotations may be computed from an image-based feature tracker, for example, or by directly measuring and integrating gyroscope readings. Any other method that produces accurate estimates of the camera's orientation may be implemented in other embodiments.

While $\theta$ has been described in terms of camera rotations, in other embodiments $\theta$ may include a vector that holds both rotations and translations of the camera in 3D space. For instance, vectors that include both rotations and translations may be produced by a structure from motion algorithm. In an embodiment, $\theta$ may include translations or rotations in the frame's image space, or other less accurate but potentially computationally cheaper approximations. As long as $\theta$ can be smoothly interpolated and the resulting $\phi$ can be input to a corresponding f and g function, the digital video stabilization may be achieved.

The phrase "smooth camera motion" may be used herein to refer to small changes in the rate of rotation. This is distinguished from small changes in rotation of neighboring frames. Small changes in the rate of rotation may produce orientations that ease in and out of imposed constraints over time. Small changes in rotation of neighboring frames interpolates to and from the constraints while producing discontinuities in orientation derivatives at the time where the constraint is enforced.

The constraint-based rotation smoothing may include an optimization that includes minimizing an energy function based on rate of rotation and the constraint.

In an embodiment, the energy function, J, to be minimized may be specified by the following example equation (12).

$$J = \sum_{i=2}^{N-1} \left\| \frac{\phi_{i+1} - \phi_i}{t_{i+1} - t_i} - \frac{\phi_i - \phi_{i-1}}{t_i - t_{i-1}} \right\|^2 \text{ s.t. } f(\phi_i, t_i) = 0 \forall i \quad (12)$$

The rotations $\phi$ may be represented as unit quaternions (also known as versors). Furthermore, the hard constraint may be replaced with a soft constraint, as specified in the following example equation (13).

$$J = \sum_{i=2}^{N-1} \left\| \frac{\phi_{i+1} - \phi_i}{t_{i+1} - t_i} - \frac{\phi_i - \phi_{i-1}}{t_i - t_{i-1}} \right\|^2 + \lambda \sum_{i=1}^{N} f(\phi_i, t_i) \quad (13)$$

$\lambda$ may determine how strongly the f constraint is enforced. For example, setting $\lambda$ to infinity may ensure that no empty regions are visible, assuming the constraints may be satisfied.

A variety of optimization algorithms may be used to minimize the energy function J in either the form shown in example equation (12) or (13). In an embodiment, an iterative algorithm based on gradient descent of example equation (12) is implemented, where the constraint may be enforced at each iteration. In an embodiment, the frames may be equally spaced temporally, such as a camera that records at a specific number of frames per second. With equally spaced frames, the denominator may be assumed to be constant and may then be taken out of the sum. The derivative may then specified by the following example equation (14).

$$\frac{\partial J}{\partial \phi_i} = C(\phi_{i+2} - 4\phi_{i+1} + 6\phi_i - 4\phi_{i-1} + \phi_{i-2}). \quad (14)$$

C may be a constant that controls the magnitude of the gradient. In some embodiments, this may be picked automatically by some forms of gradient descent, such as momentum-based methods. In other embodiments, this may be set as desired to control the rate of descent in plain gradient descent. An example value may be, for instance, $C=2/(\Delta t)^2$. Equation (14) may be specified more compactly by the following example equation (15).

$$\frac{\partial J}{\partial \phi_i} = CK\Phi_i, \quad (15)$$

where $$K = \begin{bmatrix} 1 \\ -4 \\ 6 \\ -4 \\ 1 \end{bmatrix}^T,$$

and $$\Phi_i = \begin{bmatrix} \phi_{i+2}^T \\ \phi_{i+1}^T \\ \phi_i^T \\ \phi_{i-1}^T \\ \phi_{i-2}^T \end{bmatrix}$$

The kernel K may be a Laplacian of Gaussian (LoG) filter. The LoG filter may be approximated with a Difference of Gaussians (DoG) or Difference of Boxes (DoB) filter. The kernel K may also be adjusted by convolving a LoG filter with a Gaussian filter. This may control how gradually the rate of rotation should change (or the amount of easing in and out of constraints). The choices of the LoG/DoG/DoB and/or Gaussian filters may affect the coefficients and size of kernel K, but as long as the kernel computes a form of a temporal derivative, the optimized orientations may exhibit some form of easing in and out of the constraints.

In an embodiment, the applying of the kernel to the quaternions is doing linear weighting of the 4D vectors. In theory, interpolating quaternions using spherical linear interpolation (slerp) may be an accurate method. For small changes in angles, linear interpolation plus a normalization of the resulting quaternion (lerp) at each iteration is sufficient to produce sufficiently accurate results. Such results may be achieved because sin(θ)≈θ when θ is small. The change in angle induced by handshake (e.g., changes that are to be rectified) are typically not large. Furthermore, reasonable levels of cropping, zooming, or inpainting factors may not leave much leeway. Only small angles may not produce empty regions. Thus, the angle induced by handshake between quaternions of consecutive orientations may not be large in practice, and the approximation may be both accurate and computationally efficient. Furthermore, for rapid camera rotations (e.g., the user quickly panning left), the constraint function f may dominate the resulting orientations. Thus, any inaccuracies from lerp may not be noticeable.

In an embodiment, the constraint-based rotation smoothing may be specified in terms of the following example algorithm (1).

---
Algorithm 1 Constraint-Based Rotation Smoothing
---
for i = 1..N do
    ϕ$_i$ ← θ$_i$
end for
for j = 1..numiter do
    for i = 3..(N − 2) do
        if f(n(ϕ$_i$ − CKΦ$_i$),t$_i$) = 0 then
            ϕ$_i$ ← n(ϕ$_i$ − CKΦ$_i$)
        end if
    end for
end for

---

ϕ$_i$ may be precomputed in the outer loop, such that it does not change in the inner loop. The number of iterations, "numiter", may be set sufficiently high to result in smooth rotations. The resulting ϕ$_i$ may then be fed into g to produce a stabilized output video.

n(θ) is the normalization step in lerp and may be defined as: n(θ)=θ/‖θ‖. The indexing i in algorithm 1 is selected such that θ$_i$ is valid, and therefore may depend on the size of the kernel K. In this example, the rotations at the boundaries may be held fixed. In other embodiments, the boundary may be extended via extrapolation, allowing for the entire set of orientations to be iterated over during optimization. The entire set of orientations may be specified as the following set.

$$\{\theta_i\}_{i=1}^N$$

Figure 5:
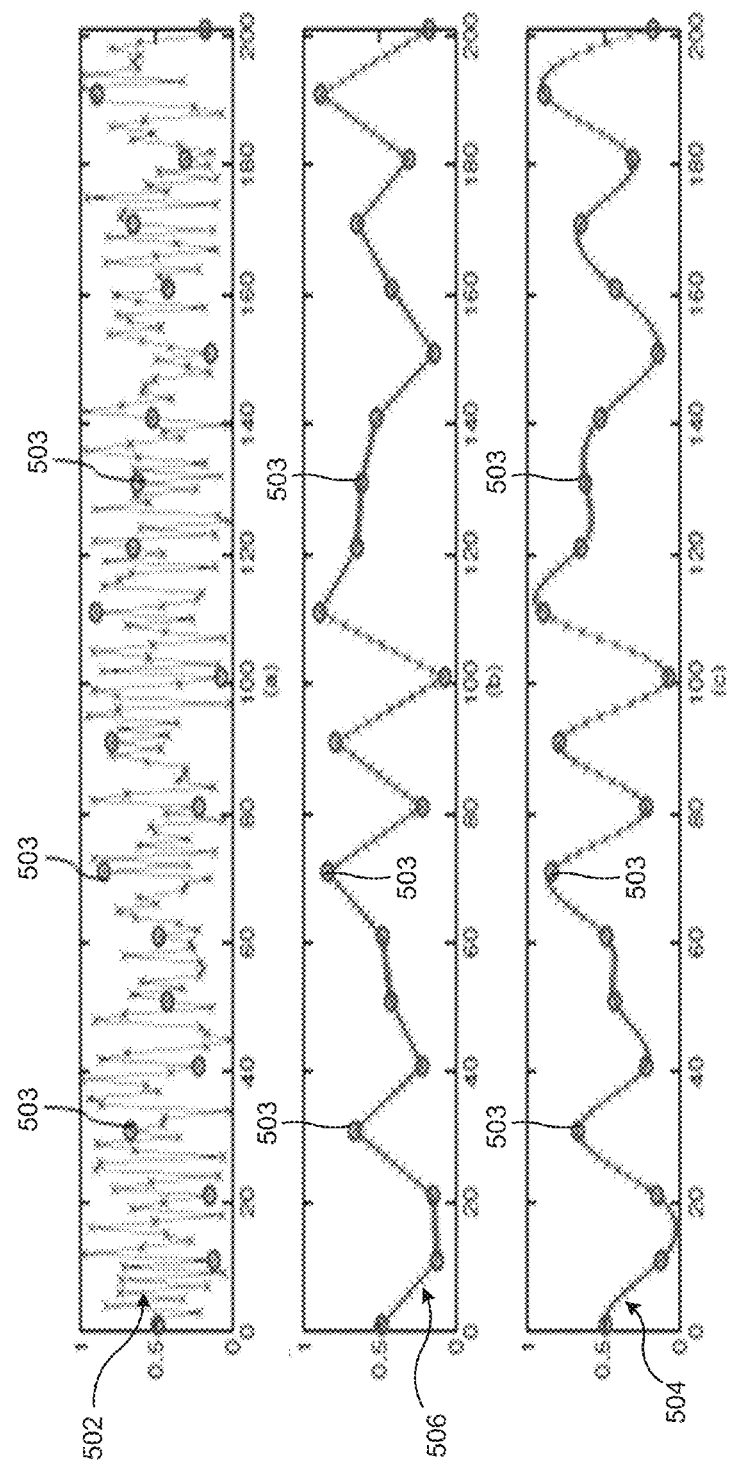
FIG. 5 illustrates graphs of examples of input data and resulting data after smoothing, according to an embodiment.

FIG. 5 illustrates graphs of examples of input data and resulting data after smoothing, according to an embodiment. The top graph includes input data 502 plotted over time with constraints 503 denoted by circles. The bottom graph includes resulting data 504, including constraints 503, that resulted from the input data 502 being smoothed in accordance with the constraint-based rotation smoothing techniques described herein. For example, the resulting data 504 may be smoothed by enforcing the rate of rotation (or derivative) to be small (or below a threshold value) while ensuring that the constraint (e.g., a threshold amount of empty regions are not produced in successive image frames) is met. Small changes in the rate of rotation may produce orientations that ease in and out of imposed constraints over time. The resulting data 504 eases in and out of the constraints 503. On the other hand, the middle graph includes resulting data 506, including constraints 503, that resulted from an attempted smoothing of the input data 502 by enforcing the change in orientation of neighboring frames to be small. Small changes in rotation of neighboring frames interpolates to and from the constraints while producing discontinuities in orientation derivatives at the time where the constraint is enforced. As shown, the resulting data 506 includes discontinuities in the derivative at the constraints 503.

Figure 6:
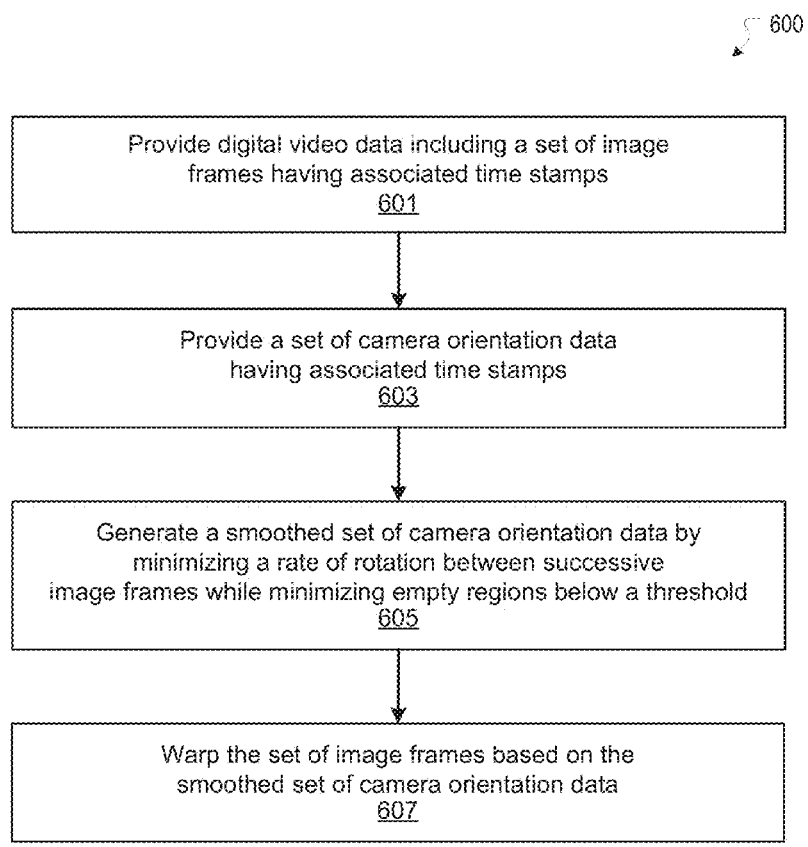
FIG. 6 illustrates an example method for constraint-based smoothing, according to an embodiment.

FIG. 6 illustrates an example method for constraint-based smoothing, according to an embodiment. At block 601 of method 600, video data is received. The video data may include a set of image frames having associated time stamps. In an embodiment, block 601 may be performed by input module 701 of FIG. 4.

At block 603, camera orientation data having associated time stamps are received. For example, the device including the camera may also include an orientation sensor, such as a gyroscope, accelerometer, etc., that generates camera orientation data that tracks the orientation of the camera during the capture of the video. The camera orientation data may include associated time stamps to link or otherwise associate the camera orientation data to the set of images in the video data. In some instances, the camera orientation data may be received at the same time as the video data, such as together with the video data. In an embodiment, block 602 may be performed by input module 701 of FIG. 4.

In one embodiment, blocks 601 and 603 may be performed by the device having the camera (e.g., smartphone or other handheld device) that is used to capture the video. For example, the video data and camera orientation data may be received upon capture of the video. In another embodiment, blocks 601 and 603 may be performed by a separate device (e.g., computer) that subsequently receives the video data captured by the device including the camera (e.g., smartphone). For example, the video data and camera orientation data may be transmitted or uploaded to a separate device from the device including the camera and orientation sensor, such as a smartphone with camera.

At block 605, a set of smoothed camera orientation data is generated by minimizing the rate of rotation between successive images frames while minimizing (or limiting) the amount of resulting empty regions in a resulting set of smoothed image frames. The resulting set of smoothed image frames are reoriented based on the smoothed set of camera orientation data.

In an embodiment, the set of smoothed camera orientation data is generated by minimizing either equations (12) or (13) described herein. In an embodiment, an iterative algorithm based on gradient descent of example equation (12) is implemented, where the constraint may be enforced at each iteration.

At block 607, the set of image frames are warped to form a set of corrected image frames. The set of image frames may be warped based on the associated time stamps for the set of image frames and the smoothed set of camera orientation data. In an embodiment, an individual image frame may be divided into a plurality of subsections, with each subsection having an associated time stamp and camera orientation. Each subsection may be realigned based on the associated time stamp and camera orientation to form an individual corrected image frame.

Reducing Visibility of Motionblur Artifacts

Digital video stabilization of video taken in low light often produces strange motion blur artifacts. This may occur because motion blur looks strange when the motion (e.g., handshake) that caused it is removed. In some instances, it may be necessary to leave just enough of the handshake in the stabilized video to explain the motion trails. If there is a clear horizontal motion trail in a frame, it may be necessary for the orientation to change horizontally according to that trail in order to for the trail to make sense. If there is no horizontal motion, then that trail may appear to pop in and out for no reason in the stabilized video, which can cause visible motion blur artifacts.

In an embodiment, the change in orientation $\Delta\theta_i$ that occurred while the camera's shutter was open is computed according to the following example equation (16).

$$\Delta\theta_i = \theta(t_i^s) - \theta(t_i^s + e_i) \quad (16)$$

$t_i^s$ may represent the time at which the shutter opened for frame $F_i$. $e_i$ is the frame's exposure duration. $\theta(t)$ is the camera's orientation at time t, which may be computed by interpolating over the following expression.

$$\{\theta_i, t_i\}_{i=1}^N$$

In the example described above for digital video stabilization and rolling shutter correction using gyroscopes, $\Delta\theta_i$ may also be computed directly from the gyroscope readings by only integrating over the period where the shutter is open. The sum inside equation (1) or equation (2) may be modified as specified in the following example equation (17).

$$\sum_{i=2}^{N-1} \left\| \frac{\phi_{i+1} - \phi_i}{t_{i+1} - t_i} - \frac{\phi_i - \phi_{i-1}}{t_i - t_{i-1}} - (\Delta\theta_i - \Delta\theta_{i-1}) \right\|^2 \quad (17)$$

Equation (17) assumes that $t_i^s \geq t_i$ and $t_i^s + e_i \leq t_{i+1}$. The shutter does not open before the timestamp of the frame, and closes prior to the start of the next frame. In another embodiment, the input time stamps may be calculated differently (e.g., $t_i$ is the time when the shutter closed) and a preprocessing step may be added to adjust the timestamps to meet the requirements.

In the embodiment described above, changes in orientation that left motion trails in the frames are preserved. In another embodiment, an approximation may be implemented as specified by the following example equation (18).

$$\sum_{i=2}^{N-1} \left\| \frac{\phi_{i+1} - \phi_i}{t_{i+1} - t_i} - \frac{\phi_i - \phi_{i-1}}{t_i - t_{i-1}} \right\|^2 + \gamma \sum_{i=1}^{N-1} \left\| \frac{\phi_{i+1} - \phi_i}{t_{i+1} - t_i} - \Delta\theta_i \right\|^2 \quad (18)$$

The approximation in equation (18) may attempt to optimize $\phi i$ such that orientation changes fall along motion trails $\Delta\theta_i$. The $\gamma$ scaling factor may control the tradeoff between smoothness and how closely the motion trails should be followed.

Selecting a Good Zoom Factor

If, for example, a tolerable zoom factor (or crop factor, inpainting factor, or any other measure applicable to the algorithm used to provide leeway for digital video stabilization) is between 1 and 1.25×. For a given video, it may be desirable to determine the smallest zoom factor that will provide enough leeway to produce smooth camera motions. In an embodiment, the smoothness of the resulting camera motion may be measured by the following example equation (19).

$$q = \frac{1}{N-2} \sum_{i=2}^{N-1} f(n(\phi_i - CK\Phi_i), t_i) \quad (19)$$

In equation (19), q measures how frequently the empty region constraint is enforced. For example, a value of q=0.1 may mean that on average f is enforced every 10 frames in order to prevent empty regions from showing through. If, for example, a spacing of 20 frames is desired for easing in and out of constraints, then a good value may be q=0.05.

To find the zoom factor z' that provides a desired q' value, algorithm 1 may be solved for a range of zoom factors (say: z $\in$ [1, 1.05, 1.1, 1.15, 1.2, 1.25]). Given a zoom factor z and the resulting $\phi_i$'s obtained by running algorithm 1, the resulting q value may be computed from equation (19). The zoom factor that provided the closest q to q' may then be selected. In another embodiment, the zoom factor z' may be found by linearly interpolating the resulting dataset (q, z) at q'. The (q, z) lookup table for typical hand-held recordings may also be precomputed and q' estimated from the median or mean rate of rotation. This approach may be less accurate for a particular video, but it may be faster because it doesn't require running the optimization algorithm multiple times.

Improving Computational Efficiency

There are a number of ways to improve the efficiency of algorithm (1), such as introducing approximations, using optimizers other than gradient descent, etc. In one embodiment, the size of the kernel in K in equation (15) may be reduced and the gradient may be updated as specified in the following example equation (20).

$$\frac{\partial J}{\partial \phi_i} = C(2K\Phi_i - K\Phi_{i-1} - K\Phi_{i+1}), \quad (20)$$

where $$K = \begin{bmatrix} -1 \\ 2 \\ -1 \end{bmatrix}^T$$

By reducing the size of the kernel (and reusing it), the computation of the gradient may be effectively sped up. Another property of the kernel in equation (20) is that the value of $K\phi i$ may be computed more accurately using slerp. This may be done over non-uniformly spaced frames as specified in the following example equation (21).

$$\partial\phi_i = \phi_i - \text{slerp}\left(\phi_{i-1}, \phi_{i+1}, \frac{t_i - t_{i-1}}{t_{i+1} - t_{i-1}}\right) \quad (21)$$

Even more accurately, the spherical tangent formed by $\phi i$ and slerp may be determined and used in equation (20). The spherical tangent formed by $\phi i$ and slerp may be specified in the following example expression.

$$\phi_i \text{ and slerp}\left(\phi_{i-1}, \phi_{i+1}, \frac{t_i - t_{i-1}}{t_{i+1} - t_{i-1}}\right)$$

In another embodiment, efficiency may be improved by improving the rate of convergence of algorithm 1 described herein. This may be achieved by running it in coarse to fine mode. For example, algorithm 1 may be initialized by supplying and solving for every 16th orientation $\phi_i$. Linear or cubic interpolation (e.g., slerp or squad) may then be used to compute the $\phi_i$ in between. A value for every 8th orientation is obtained. Algorithm 1 may be run again, but now optimizing every 8th orientation for smoothness and constraints. This may be repeated until algorithm 1 has been run over every orientation.

Running coarse to fine may permit algorithm 1 to be run for significantly fewer iterations at each step. The overall camera motion may be smoothed out and then the orientations may be refined to meet constraints at increasingly smaller frame intervals while still remaining smooth. In another embodiment, non-uniform sampling may be used. For example, instead of picking every 16th frame, frames may be picked based on how far the orientation has deviated from the previously picked frame. The segments may then be subdivided until a smoothed orientation has been computed for all frames.

Since coarser or non-uniform sampling may introduce larger consecutive changes in orientations, using the slerp modification presented in equation (21) may produce more accurate results.

Example Applications to Real-Time Stabilization

The following is provided as an example embodiment of adopting the algorithm to real-time settings. With N frames kept in memory, the algorithm is run in a sliding window fashion. Index i may denote the start of the sliding window, and i+N may denote the end. Orientations inside the sliding window may be malleable in that they may be updated by running the algorithm. These orientations may be specified by the following set (2).

$$\{\theta_j\}_{j=i}^{i+N}$$

Orientations preceding the sliding window (e.g., $\phi_{i-1}$) may be fixed. The starting orientation may be $\phi_i-1$ and the rate of rotation (e.g., as measured by the gyroscope or computed from a feature tracker) may be integrated to obtain orientations $\{\theta_i, \theta_{i+1}, \ldots, \theta_{i+N}\}$. This may be used as input for the optimization algorithm and compute $\{\phi_i, \phi_{i+1}, \ldots, \phi_{i+N-2}\}$. The orientations $\{\phi_{i-2}, \phi_{i-1}\}$ and $\{\phi_{i+N-1}=\phi_{i+N-1}, \phi_{i+N}=\phi_{i+N}\}$ may be held fixed and may serve as the boundary conditions that ensure that motions are smooth going into and out of the sliding window.

Once the algorithm is run, the orientation of $\phi_i$, which may be used to warp frame $F_i$ may be obtained. Once the frame has been warped, it may be passed along to the encoder and removed from the buffer of N frames. A new frame may then be received from the camera and the sliding window may be advanced by one frame.

The procedure may be repeated until the recording stops and all frames have been processed. For the very first frame, i=1, $\{\phi_{-1}, \phi_0\}$ may be undefined. $\phi_{-1}$ and $\phi_0$ may be set to the identity quaternion. Once the last frame is received, the buffer may be flushed by using the orientations computed inside the final sliding window to warp their respective frames.

In some instances, a small buffer size (e.g., N=5) may not allow an easing in and out of constraints. In such cases, it may be necessary to modify the constraint function f to be a soft constraint that ramps up to a hard constraint. This may be referred to as function f'($\phi$, t). Instead of returning 0 or 1, f' returns a new orientation $\phi'$, that may be pushed away from the frame border. The closer orientation $\phi$ comes to showing an empty region, the more f' may push the resulting $\phi'$ away from the empty region. Algorithm 1 may then be reformulated as specified in the following example algorithm (2).

---
Algorithm 2 Soft Constraint-Based Rotation Smoothing for i = 1..N do
   $\phi_i \leftarrow \theta_i$
end for
for j = 1..numiter do
   for i = 3..(N − 2) do ---
-continued Algorithm 2 Soft Constraint-Based Rotation Smoothing $\phi_i \leftarrow f'(n(\phi_i - CK\Phi_i), t_i)$
   end for
end for

---

Note that if f' simply returns $\phi_i$ when orientation $n(\phi_i - CK\phi_i)$ results in empty regions, then algorithms 1 and 2 may be equivalent. The optimization rate of algorithm 1 may be improved by using algorithm 2, with a function f' that slerps $\phi i$ towards $n(\phi_i - CK\phi_i)$ but stops just at the point where empty regions are about to appear.

Social Networking System—Example Implementation

Figure 7:
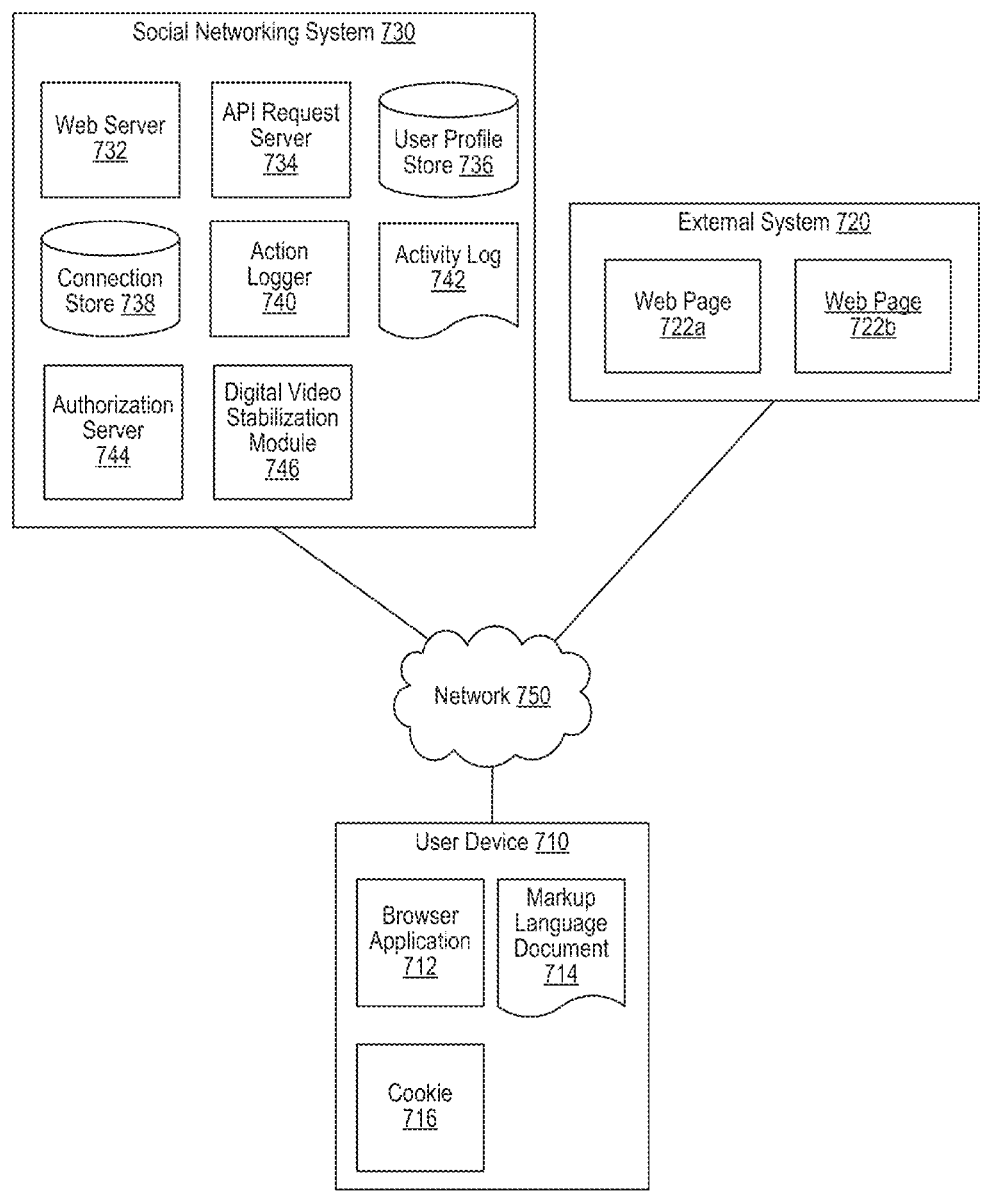
FIG. 7 illustrates an example network diagram of a system for modifying a set of image frames from a digital video to produce a stabilized digital video within a social networking system, according to an embodiment.

FIG. 7 is a network diagram of an example system 700 for estimating user attention on a website or application in accordance with an embodiment of the invention. The system 700 includes one or more user devices 710, one or more external systems 720, a social networking system 730, and a network 750. In an embodiment, the social networking system discussed in connection with the embodiments described above may be implemented as the social networking system 730. For purposes of illustration, the embodiment of the system 700, shown by FIG. 7, includes a single external system 720 and a single user device 710. However, in other embodiments, the system 700 may include more user devices 710 and/or more external systems 720. In certain embodiments, the social networking system 730 is operated by a social network provider, whereas the external systems 720 are separate from the social networking system 730 in that they may be operated by different entities. In various embodiments, however, the social networking system 730 and the external systems 720 operate in conjunction to provide social networking services to users (or members) of the social networking system 730. In this sense, the social networking system 730 provides a platform or backbone, which other systems, such as external systems 720, may use to provide social networking services and functionalities to users across the Internet.

The user device 710 comprises one or more computing devices that can receive input from a user and transmit and receive data via the network 750. In one embodiment, the user device 710 is a conventional computer system executing, for example, a Microsoft Windows compatible operating system (OS), Apple OS X, and/or a Linux distribution. In another embodiment, the user device 710 can be a device having computer functionality, such as a smart-phone, a tablet, a personal digital assistant (PDA), a mobile telephone, etc. The user device 710 is configured to communicate via the network 750. The user device 710 can execute an application, for example, a browser application that allows a user of the user device 710 to interact with the social networking system 730. In another embodiment, the user device 710 interacts with the social networking system 730 through an application programming interface (API) provided by the native operating system of the user device 710, such as iOS and ANDROID. The user device 710 is configured to communicate with the external system 720 and the social networking system 730 via the network 750, which may comprise any combination of local area and/or wide area networks, using wired and/or wireless communication systems.

In one embodiment, the network 750 uses standard communications technologies and protocols. Thus, the network 750 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 750 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 750 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 710 may display content from the external system 720 and/or from the social networking system 730 by processing a markup language document 714 received from the external system 720 and from the social networking system 730 using a browser application 712. The markup language document 714 identifies content and one or more instructions describing formatting or presentation of the content. By executing the instructions included in the markup language document 714, the browser application 712 displays the identified content using the format or presentation described by the markup language document 714. For example, the markup language document 714 includes instructions for generating and displaying a web page having multiple frames that include text and/or image data retrieved from the external system 720 and the social networking system 730. In various embodiments, the markup language document 714 comprises a data file including extensible markup language (XML) data, extensible hypertext markup language (XHTML) data, or other markup language data. Additionally, the markup language document 714 may include JavaScript Object Notation (JSON) data, JSON with padding (JSONP), and JavaScript data to facilitate data-interchange between the external system 720 and the user device 710. The browser application 712 on the user device 710 may use a JavaScript compiler to decode the markup language document 714.

The markup language document 714 may also include, or link to, applications or application frameworks such as FLASH™ or Unity™ applications, the SilverLight™ application framework, etc.

In one embodiment, the user device 710 also includes one or more cookies 716 including data indicating whether a user of the user device 710 is logged into the social networking system 730, which may enable modification of the data communicated from the social networking system 730 to the user device 710.

The external system 720 includes one or more web servers that include one or more web pages 722a, 722b, which are communicated to the user device 710 using the network 750. The external system 720 is separate from the social networking system 730. For example, the external system 720 is associated with a first domain, while the social networking system 730 is associated with a separate social networking domain. Web pages 722a, 722b, included in the external system 720, comprise markup language documents 714 identifying content and including instructions specifying formatting or presentation of the identified content.

The social networking system 730 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 730 may be administered, managed, or controlled by an operator. The operator of the social networking system 730 may be a human being, an automated application, or a series of applications for managing content, regulating policies, and collecting usage metrics within the social networking system 730. Any type of operator may be used.

Users may join the social networking system 730 and then add connections to any number of other users of the social networking system 730 to whom they desire to be connected. As used herein, the term "friend" refers to any other user of the social networking system 730 to whom a user has formed a connection, association, or relationship via the social networking system 730. For example, in an embodiment, if users in the social networking system 730 are represented as nodes in the social graph, the term "friend" can refer to an edge formed between and directly connecting two users.

Connections may be added explicitly by a user or may be automatically created by the social networking system 730 based on common characteristics of the users (e.g., users who are alumni of the same educational institution). For example, a first user specifically selects a particular other user to be a friend. Connections in the social networking system 730 are usually in both directions, but need not be, so the terms "user" and "friend" depend on the frame of reference. Connections between users of the social networking system 730 are usually bilateral ("two-way"), or "mutual," but connections may also be unilateral, or "one-way." For example, if Bob and Joe are both users of the social networking system 730 and connected to each other, Bob and Joe are each other's connections. If, on the other hand, Bob wishes to connect to Joe to view data communicated to the social networking system 730 by Joe, but Joe does not wish to form a mutual connection, a unilateral connection may be established. The connection between users may be a direct connection; however, some embodiments of the social networking system 730 allow the connection to be indirect via one or more levels of connections or degrees of separation.

In addition to establishing and maintaining connections between users and allowing interactions between users, the social networking system 730 provides users with the ability to take actions on various types of items supported by the social networking system 730. These items may include groups or networks (i.e., social networks of people, entities, and concepts) to which users of the social networking system 730 may belong, events or calendar entries in which a user might be interested, computer-based applications that a user may use via the social networking system 730, transactions that allow users to buy or sell items via services provided by or through the social networking system 730, and interactions with advertisements that a user may perform on or off the social networking system 730. These are just a few examples of the items upon which a user may act on the social networking system 730, and many others are possible. A user may interact with anything that is capable of being represented in the social networking system 730 or in the external system 720, separate from the social networking system 730, or coupled to the social networking system 730 via the network 750.

The social networking system 730 is also capable of linking a variety of entities. For example, the social networking system 730 enables users to interact with each other as well as external systems 720 or other entities through an API, a web service, or other communication channels. The social networking system 730 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 730. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 730 modifies edges connecting the various nodes to reflect the relationships and interactions.

The social networking system 730 also includes user-generated content, which enhances a user's interactions with the social networking system 730. User-generated content may include anything a user can add, upload, send, or "post" to the social networking system 730. For example, a user communicates posts to the social networking system 730 from a user device 710. Posts may include data such as status updates or other textual data, location information, images such as photos, videos, links, music or other similar data and/or media. Content may also be added to the social networking system 730 by a third party. Content "items" are represented as objects in the social networking system 730. In this way, users of the social networking system 730 are encouraged to communicate with each other by posting text and content items of various types of media through various communication channels. Such communication increases the interaction of users with each other and increases the frequency with which users interact with the social networking system 730.

The social networking system 730 includes a web server 732, an API request server 734, a user profile store 736, a connection store 738, an action logger 740, an activity log 742, an authorization server 744, and a digital video stabilization module 746. In an embodiment of the invention, the social networking system 730 may include additional, fewer, or different components for various applications. Other components, such as network interfaces, security mechanisms, load balancers, failover servers, management and network operations consoles, and the like are not shown so as to not obscure the details of the system.

The user profile store 736 maintains information about user accounts, including biographic, demographic, and other types of descriptive information, such as work experience, educational history, hobbies or preferences, location, and the like that has been declared by users or inferred by the social networking system 730. This information is stored in the user profile store 736 such that each user is uniquely identified. The social networking system 730 also stores data describing one or more connections between different users in the connection store 738. The connection information may indicate users who have similar or common work experience, group memberships, hobbies, or educational history. Additionally, the social networking system 730 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 730, such as non-person entities, buckets, cluster centers, images, interests, pages, external systems, concepts, and the like are also stored in the connection store 738.

The social networking system 730 maintains data about objects with which a user may interact. To maintain this data, the user profile store 736 and the connection store 738 store instances of the corresponding type of objects maintained by the social networking system 730. Each object type has information fields that are suitable for storing information appropriate to the type of object. For example, the user profile store 736 contains data structures with fields suitable for describing a user's account and information related to a user's account. When a new object of a particular type is created, the social networking system 730 initializes a new data structure of the corresponding type, assigns a unique object identifier to it, and begins to add data to the object as needed. This might occur, for example, when a user becomes a user of the social networking system 730, the social networking system 730 generates a new instance of a user profile in the user profile store 736, assigns a unique identifier to the user account, and begins to populate the fields of the user account with information provided by the user.

The connection store 738 includes data structures suitable for describing a user's connections to other users, connections to external systems 720 or connections to other entities. The connection store 738 may also associate a connection type with a user's connections, which may be used in conjunction with the user's privacy setting to regulate access to information about the user. In an embodiment of the invention, the user profile store 736 and the connection store 738 may be implemented as a federated database.

Data stored in the connection store 738, the user profile store 736, and the activity log 742 enables the social networking system 730 to generate the social graph that uses nodes to identify various objects and edges connecting nodes to identify relationships between different objects. For example, if a first user establishes a connection with a second user in the social networking system 730, user accounts of the first user and the second user from the user profile store 736 may act as nodes in the social graph. The connection between the first user and the second user stored by the connection store 738 is an edge between the nodes associated with the first user and the second user. Continuing this example, the second user may then send the first user a message within the social networking system 730. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 730 (or, alternatively, in an image maintained by another system outside of the social networking system 730). The image may itself be represented as a node in the social networking system 730. This tagging action may create edges between the first user and the second user as well as create an edge between each of the users and the image, which is also a node in the social graph. In yet another example, if a user confirms attending an event, the user and the event are nodes obtained from the user profile store 736, where the attendance of the event is an edge between the nodes that may be retrieved from the activity log 742. By generating and maintaining the social graph, the social networking system 730 includes data describing many different types of objects and the interactions and connections among those objects, providing a rich source of socially relevant information.

The web server 732 links the social networking system 730 to one or more user devices 710 and/or one or more external systems 720 via the network 750. The web server 732 serves web pages, as well as other web-related content, such as Java, JavaScript, Flash, XML, and so forth. The web server 732 may include a mail server or other messaging functionality for receiving and routing messages between the social networking system 730 and one or more user devices 710. The messages can be instant messages, queued messages (e.g., email), text and SMS messages, or any other suitable messaging format.

The API request server 734 allows one or more external systems 720 and user devices 710 to call access information from the social networking system 730 by calling one or more API functions. The API request server 734 may also allow external systems 720 to send information to the social networking system 730 by calling APIs. The external system 720, in one embodiment, sends an API request to the social networking system 730 via the network 750, and the API request server 734 receives the API request. The API request server 734 processes the request by calling an API associated with the API request to generate an appropriate response, which the API request server 734 communicates to the external system 720 via the network 750. For example, responsive to an API request, the API request server 734 collects data associated with a user, such as the user's connections that have logged into the external system 720, and communicates the collected data to the external system 720. In another embodiment, the user device 710 communicates with the social networking system 730 via APIs in the same manner as external systems 720.

The action logger 740 is capable of receiving communications from the web server 732 about user actions on and/or off the social networking system 730. The action logger 740 populates the activity log 742 with information about user actions, enabling the social networking system 730 to discover various actions taken by its users within the social networking system 730 and outside of the social networking system 730. Any action that a particular user takes with respect to another node on the social networking system 730 may be associated with each user's account, through information maintained in the activity log 742 or in a similar database or other data repository. Examples of actions taken by a user within the social networking system 730 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 730, the action is recorded in the activity log 742. In one embodiment, the social networking system 730 maintains the activity log 742 as a database of entries. When an action is taken within the social networking system 730, an entry for the action is added to the activity log 742. The activity log 742 may be referred to as an action log.

Additionally, user actions may be associated with concepts and actions that occur within an entity outside of the social networking system 730, such as an external system 720 that is separate from the social networking system 730. For example, the action logger 740 may receive data describing a user's interaction with an external system 720 from the web server 732. In this example, the external system 720 reports a user's interaction according to structured actions and objects in the social graph.

Other examples of actions where a user interacts with an external system 720 include a user expressing an interest in an external system 720 or another entity, a user posting a comment to the social networking system 730 that discusses an external system 720 or a web page 722a within the external system 720, a user posting to the social networking system 730 a Uniform Resource Locator (URL) or other identifier associated with an external system 720, a user attending an event associated with an external system 720, or any other action by a user that is related to an external system 720. Thus, the activity log 742 may include actions describing interactions between a user of the social networking system 730 and an external system 720 that is separate from the social networking system 730.

The authorization server 744 enforces one or more privacy settings of the users of the social networking system 730. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 720, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 720. One embodiment allows the specification of the set of entities to comprise an enumeration of entities. For example, the user may provide a list of external systems 720 that are allowed to access certain information. Another embodiment allows the specification to comprise a set of entities along with exceptions that are not allowed to access the information. For example, a user may allow all external systems 720 to access the user's work information, but specify a list of external systems 720 that are not allowed to access the work information. Certain embodiments call the list of exceptions that are not allowed to access certain information a "block list". External systems 720 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 744 contains logic to determine if certain information associated with a user can be accessed by a user's friends, external systems 720, and/or other applications and entities. The external system 720 may need authorization from the authorization server 744 to access the user's more private and sensitive information, such as the user's work phone number. Based on the user's privacy settings, the authorization server 744 determines if another user, the external system 720, an application, or another entity is allowed to access information associated with the user, including information about actions taken by the user.

The social networking system 730 may include a digital video stabilization module 746. The digital video stabilization module 746 may compute a set of smooth camera orientations under the constraint that empty regions are not visible, or below a minimum threshold value. The digital video stabilization module 746 may then generate warped frames based on the set of new smoothed camera orientations. In an embodiment, the digital video stabilization module 746 may be implemented as the digital video stabilization 400 of FIG. 4.

Hardware Implementation

Figure 8:
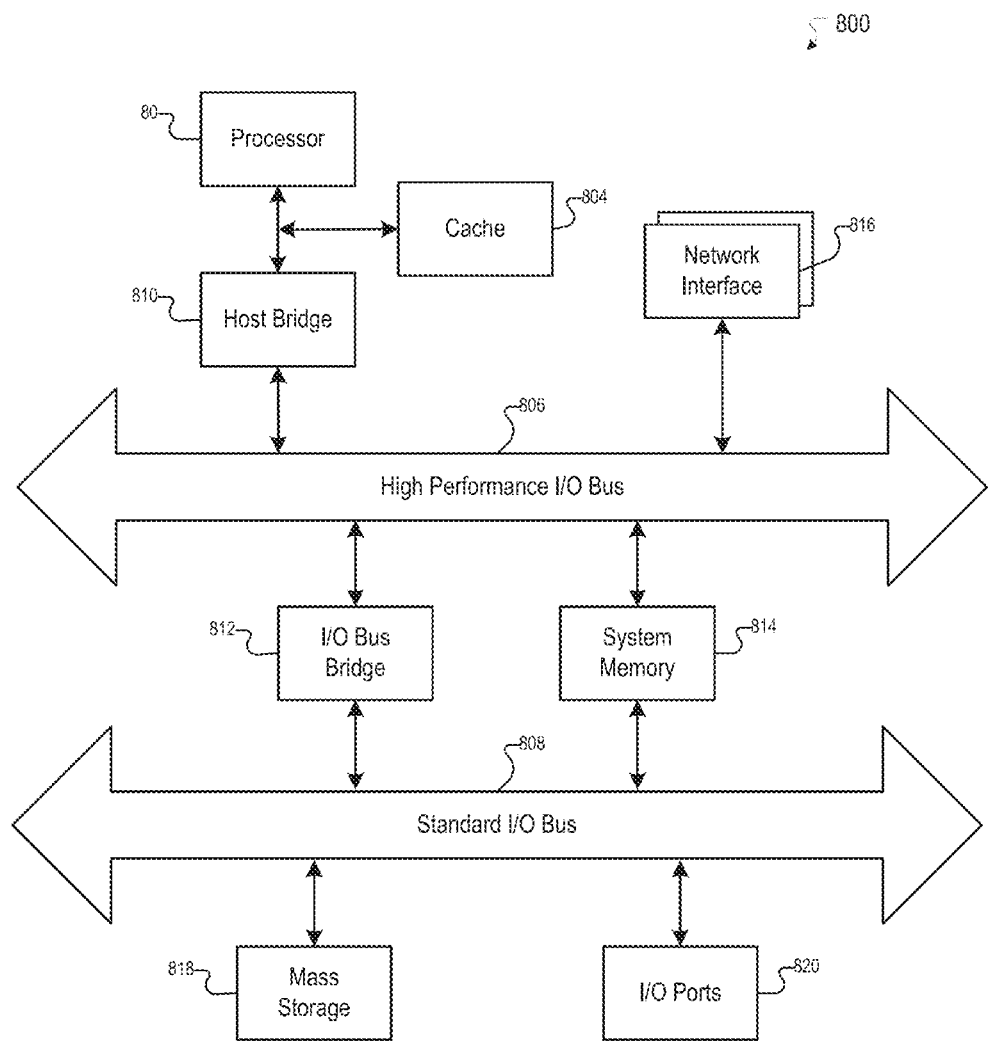
FIG. 8 illustrates an example computer system that may be used to implement one or more of the embodiments described herein, according to an embodiment.

The foregoing processes and features can be implemented by a wide variety of machine and computer system architectures and in a wide variety of network and computing environments. FIG. 8 illustrates an example of a computer system 800 that may be used to implement one or more of the embodiments described herein in accordance with an embodiment of the invention. The computer system 800 includes sets of instructions for causing the computer system 800 to perform the processes and features discussed herein. The computer system 800 may be connected (e.g., networked) to other machines. In a networked deployment, the computer system 800 may operate in the capacity of a server machine or a client machine in a client-server network environment, or as a peer machine in a peer-to-peer (or distributed) network environment. In an embodiment of the invention, the computer system 800 may be a component of the social networking system described herein. In an embodiment of the invention, the computer system 800 may be one server among many that constitutes all or part of the social networking system 830.

The computer system 800 includes a processor 802, a cache 804, and one or more executable modules and drivers, stored on a computer-readable medium, directed to the processes and features described herein. Additionally, the computer system 800 includes a high performance input/output (I/O) bus 806 and a standard I/O bus 808. A host bridge 810 couples processor 802 to high performance I/O bus 806, whereas I/O bus bridge 812 couples the two buses 806 and 808 to each other. A system memory 814 and one or more network interfaces 816 couple to high performance I/O bus 806. The computer system 800 may further include video memory and a display device coupled to the video memory (not shown). Mass storage 818 and I/O ports 820 couple to the standard I/O bus 808. The computer system 800 may optionally include a keyboard and pointing device, a display device, or other input/output devices (not shown) coupled to the standard I/O bus 808. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 800, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 800 are described in greater detail below. In particular, the network interface 816 provides communication between the computer system 800 and any of a wide range of networks, such as an Ethernet (e.g., IEEE 802.3) network, a backplane, etc. The mass storage 818 provides permanent storage for the data and programming instructions to perform the above-described processes and features implemented by the respective computing systems identified above, whereas the system memory 814 (e.g., DRAM) provides temporary storage for the data and programming instructions when executed by the processor 802. The I/O ports 820 may be one or more serial and/or parallel communication ports that provide communication between additional peripheral devices, which may be coupled to the computer system 800.

The computer system 800 may include a variety of system architectures, and various components of the computer system 800 may be rearranged. For example, the cache 804 may be on-chip with processor 802. Alternatively, the cache 804 and the processor 802 may be packed together as a "processor module", with processor 802 being referred to as the "processor core". Furthermore, certain embodiments of the invention may neither require nor include all of the above components. For example, peripheral devices coupled to the standard I/O bus 808 may couple to the high performance I/O bus 806. In addition, in some embodiments, only a single bus may exist, with the components of the computer system 800 being coupled to the single bus. Furthermore, the computer system 800 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 800 that, when read and executed by one or more processors, cause the computer system 800 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 800, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 802. Initially, the series of instructions may be stored on a storage device, such as the mass storage 818. However, the series of instructions can be stored on any suitable computer readable storage medium. Furthermore, the series of instructions need not be stored locally, and could be received from a remote storage device, such as a server on a network, via the network interface 816. The instructions are copied from the storage device, such as the mass storage 818, into the system memory 814 and then accessed and executed by the processor 802. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 800 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed:

1. A computer implemented method comprising:
providing, by a computer system, digital video data comprising a set of image frames having associated time stamps and a set of camera orientation data having associated time stamps, wherein the set of camera orientation data is based on an orientation of a camera during a capture of the digital video data by the camera; and
generating, by the computer system, a smoothed set of camera orientation data by minimizing a rate of rotation between successive image frames while minimizing an amount of empty regions in a resulting set of smoothed image frames reoriented based on the smoothed set of camera orientation data.

2. The method of claim 1, wherein the amount of empty regions in the resulting set of smoothed image frames is minimized to zero.

3. The method of claim 1, wherein the amount of empty regions in the resulting set of smoothed image frames is minimized below a threshold value.

4. The method of claim 1, further comprising warping the set of image frames based on the associated time stamps for the set of image frames and the smoothed set of camera orientation data to form a set of corrected image frames.

5. The method of claim 4, wherein the warping the set of image frames based on the associated time stamps for the set of image frames and the smoothed set of camera orientation data to form a set of corrected image frames comprises:
dividing an individual image frame into a plurality of subsections, each subsection having an associated time stamp and camera orientation; and
realigning each subsection based on the associated time stamp and camera orientation to form an individual corrected image frame.

6. The method of claim 4, further comprising displaying the set of corrected image frames as a video.

7. The method of claim 6, wherein the amount of empty regions in the resulting set of smoothed image frames is minimized below a threshold value.

8. The method of claim 7, further comprising inpainting the amount of empty regions below the threshold value.

9. The method of claim 1, wherein the set of camera orientation data having associated time stamps is provided from a gyroscope of a handheld device.

10. The method of claim 1, wherein the set of image frames is provided from a camera of a handheld device.

11. The method of claim 1, wherein the set of camera orientation data having associated time stamps is provided from a gyroscope of a handheld device comprising a mobile phone and a digital camera, and wherein the set of image frames is provided from the digital camera.

12. The method of claim 1, wherein the generating the smoothed set of camera orientation data comprises an iterative optimization based on gradient descent.

13. The method of claim 1, wherein the generating the smoothed set of camera orientation data comprises filtering based on a Gaussian filter.

14. The method of claim 1, wherein the generating the smoothed set of camera orientation data comprises filtering based on a temporal derivative.

15. The method of claim 1, wherein the set of camera orientation data includes rotations without any translations.

16. The method of claim 1, wherein the set of camera orientation data includes vectors having both rotations and translations.

17. The method of claim 1, wherein the generating the smoothed set of camera orientation data is performed by a social networking system.

18. The method of claim 17, wherein the set of image frames having associated time stamps and the set of camera orientation data having associated time stamps are uploaded to the social networking system by a user of the social networking system.

19. A system comprising:
    at least one processor, and
    a memory storing instructions configured to instruct the at least one processor to perform:
        providing digital video data comprising a set of image frames having associated time stamps and a set of camera orientation data having associated time stamps; and
        generating a smoothed set of camera orientation data by minimizing a rate of rotation between successive image frames while minimizing an amount of empty regions in a resulting set of smoothed image frames reoriented based on the smoothed set of camera orientation data, wherein minimizing the rate of rotation between successive image frames is based on at least a portion of the set of camera orientation data.

20. A non-transitory computer storage medium storing computer-executable instructions that, when executed, cause a computer system to perform computer-implemented method comprising:
    providing digital video data comprising a set of image frames having associated time stamps and a set of camera orientation data having associated time stamps, wherein the set of camera orientation data is based on an orientation of a camera during a capture of the digital video data by the camera; and
    generating a smoothed set of camera orientation data by minimizing a rate of rotation between successive image frames while minimizing an amount of empty regions in a resulting set of smoothed image frames reoriented based on the smoothed set of camera orientation data, wherein minimizing the rate of rotation between successive image frames is based on at least a portion of the set of camera orientation data.

* * * * *